United States Patent
Karjalainen et al.

(10) Patent No.: US 12,438,683 B2
(45) Date of Patent: Oct. 7, 2025

(54) BEAM GROUP-BASED DOWNLINK TRANSMIT BEAM INDICATION

(71) Applicant: Nokia Technologies Oy, Espoo (FI)

(72) Inventors: Juha Karjalainen, Sotkamo (FI); Samuli Turtinen, Ii (FI); Sami-Jukka Hakola, Kempele (FI); Keeth Saliya Jayasinghe Laddu, Espoo (FI); Timo Koskela, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 419 days.

(21) Appl. No.: 17/999,290

(22) PCT Filed: Mar. 9, 2021

(86) PCT No.: PCT/FI2021/050170
§ 371 (c)(1),
(2) Date: Nov. 18, 2022

(87) PCT Pub. No.: WO2021/234212
PCT Pub. Date: Nov. 25, 2021

(65) Prior Publication Data
US 2023/0188308 A1     Jun. 15, 2023

Related U.S. Application Data

(60) Provisional application No. 63/029,109, filed on May 22, 2020.

(51) Int. Cl.
*H04B 7/0408* (2017.01)
*H04B 7/06* (2006.01)
*H04L 5/00* (2006.01)

(52) U.S. Cl.
CPC ......... *H04L 5/0096* (2013.01); *H04B 7/0408* (2013.01); *H04B 7/06952* (2023.05)

(58) Field of Classification Search
CPC ... H04L 5/0096; H04B 7/0408; H04B 7/0691; H04B 7/0695; H04B 7/088
See application file for complete search history.

(56) References Cited

U.S. PATENT DOCUMENTS 12,101,771 B2 *  9/2024  Matsumura ........... H04L 5/0091
2018/0343653 A1 * 11/2018  Guo ........................ H04B 7/088
(Continued)

FOREIGN PATENT DOCUMENTS

WO      2020/029200 A1     2/2020
WO      WO-2020048364 A1 *  3/2020  ........... H04L 1/1861

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.

(Continued)

*Primary Examiner* — Fahmida S Chowdhury
(74) *Attorney, Agent, or Firm* — Barta Jones, PLLC

(57) ABSTRACT

Systems, methods, apparatuses, and computer program products for beam group-based downlink transmit beam indication. Certain embodiments may provide enhancements related to physical layer design for multiple input multiple output and/or enhancements for a beam indication framework for scenarios with multiple transmission reception points and user equipment equipped with multiple antenna panels. A network node may transmit, and a user equipment may obtain, information indicating that one or more activated transmission configuration indictor states are associated with a set of beam groups.

12 Claims, 12 Drawing Sheets

(56) References Cited

U.S. PATENT DOCUMENTS

| | | | |
|---|---|---|---|
| 2019/0394662 A1* | 12/2019 | Josan | H04W 24/10 |
| 2020/0022000 A1* | 1/2020 | Venugopal | H04B 7/0619 |
| 2020/0153581 A1* | 5/2020 | Tsai | H04W 24/10 |
| 2020/0229257 A1* | 7/2020 | Venugopal | H04W 76/19 |
| 2020/0267734 A1* | 8/2020 | Khoshnevisan | H04L 5/0025 |
| 2021/0184803 A1* | 6/2021 | Ge | H04L 5/0055 |
| 2021/0314128 A1* | 10/2021 | Li | H04L 5/0096 |
| 2022/0158805 A1* | 5/2022 | Frenne | H04L 5/0053 |
| 2023/0027718 A1* | 1/2023 | Venugopal | H04L 5/0051 |
| 2023/0156742 A1* | 5/2023 | Zheng | H04L 5/0051 |
| | | | 370/329 |

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; Multiplexing and channel coding (Release 16)", 3GPP TS 38.212, V16.1.0, Mar. 2020, pp. 1-146.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

International Search Report and Written Opinion received for corresponding Patent Cooperation Treaty Application No. PCT/FI2021/050170, dated Jun. 11, 2021, 15 pages.

"Remaining Issues on Multi-TRP Enhancement", 3GPP TSG RAN WG1 #99, R1-1912823, Agenda: 7.2.8.2, Apple Inc, Nov. 18-22, 2019, 10 pages.

* cited by examiner

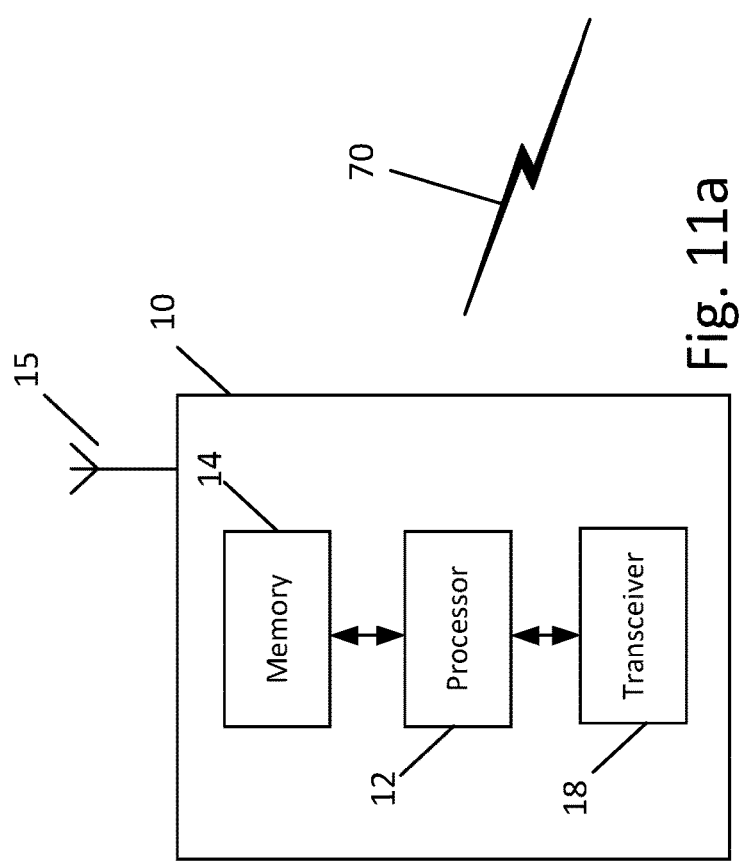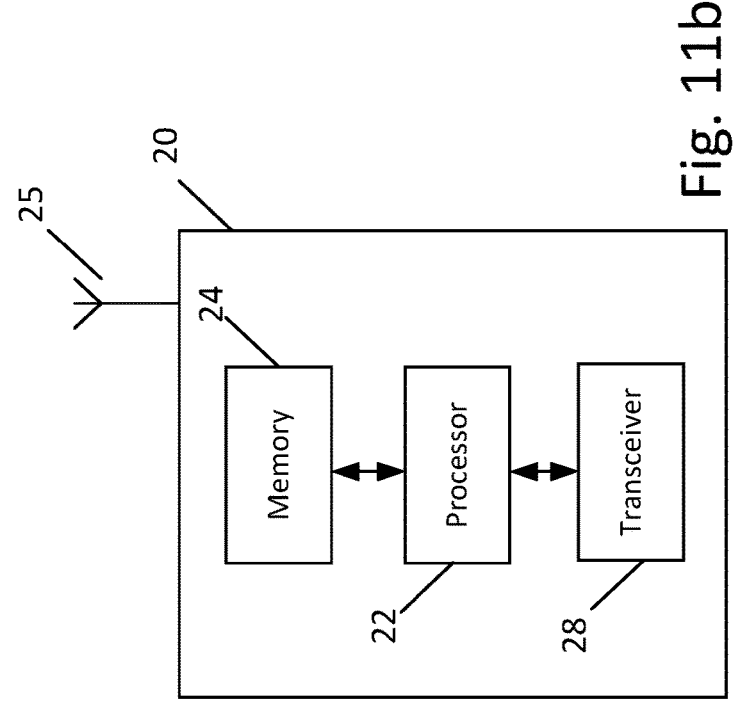

BEAM GROUP-BASED DOWNLINK TRANSMIT BEAM INDICATION

RELATED APPLICATION

This application was originally filed as PCT Application No. PCT/FI2021/050170, filed on Mar. 9, 2021, which claims priority from U.S. Provisional Application No. 63/029,109, filed on May 22, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for beam group-based downlink (DL) transmit (TX) beam indication.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G is mostly built on a new radio (NR), but a 5G network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In a first aspect, there is provided a first apparatus. The first apparatus comprises at least one processor and at least one memory including computer program code. The at least one memory and the computer program code are configured to, with the at least one processor, cause the first apparatus to: obtain information indicating that one or more activated transmission configuration indicator states are associated with a set of beam groups and operate based on the obtained information.

In some embodiments, the first apparatus may be caused to obtain the information explicitly from a command for activating or deactivating one or more transmission configuration indicator states. In some embodiments, the command may comprise information for enabling or disabling an association of one or more transmission configuration indicator states with the set of beam groups. In some embodiments, the first apparatus may be caused to obtain the information implicitly from a beam group configuration signaling that configures the number of beams in a beam group of the set of beam groups, or the number of beam groups included in the set of beam groups.

In some embodiments, when operating based on the obtained information, the first apparatus may be further caused to determine that the one or more activated transmission configuration indicator states are associated with beam group-based reporting for the set of beam groups.

In some embodiments, when operating based on the obtained information, the first apparatus may be caused to: detect a control signal indicating one of the one or more activated transmission configuration indicator states to use; determine whether the indicated one transmission configuration indicator state is associated with a same beam group as that associated with a transmission configuration indicator state in use; and operate based on the determination.

In some embodiments, the first apparatus may be caused to: based on the indicated one transmission configuration indicator state being determined to be associated with the same beam group, determine that a communication from a network node is to use a time offset associated with the same beam group, and/or, the communication is to use one or more simultaneous spatial domain receive filters that are the same as that used for the transmission configuration indicator state in use.

In some embodiments, the first apparatus may be caused to: based on the indicated one transmission configuration indicator state being determined to be associated with a different beam group than that associated with the transmission configuration indicator state in use, determine that a communication from a network node is to use a different time offset than a time offset used for a beam group of the transmission configuration indicator state in use, and/or, the communication is to use one or more simultaneous spatial domain receive filters that are different from that used for the indicated transmission configuration indicator state in use.

In some embodiments, the first apparatus may be caused to determine that the communication from the network node is to use a different time offset, based on a group report for a transmission configuration indicator state being outdated.

In some embodiments, a beam group may be based on one or more spatial characteristics of a receive filter or latency for a beam switch.

In a second aspect, a second apparatus is provided. The second apparatus comprises at least one processor and at least one memory including computer program code. The at least one memory and the computer program code are configured to, with the at least one processor, cause the second apparatus at least to transmit information indicating that one or more activated transmission configuration indicator states are associated with a set of beam groups; and communicate with a terminal node based on the transmitted information.

In a third aspect, a method is provided. The method may be performed by a terminal node and comprises obtaining information indicating that one or more activated transmission configuration indicator states are associated with a set of beam groups; and operating based on the obtained information. In some embodiments, operating based on the obtained information may further comprise determining that the one or more activated transmission configuration indicator states are associated with beam group-based reporting for the set of beam groups. In some embodiments, operating based on the obtained information may further comprise detecting a control signal indicating one of the one or more activated transmission configuration indicator states to use;

determining whether the indicated one transmission configuration indicator state is associated with a same beam group as that associated with a transmission configuration indicator state in use; and operating based on the determination.

In a fourth aspect, another method is provided. The method may be performed by a network node and may comprise transmitting information indicating that one or more activated transmission configuration indicator states are associated with a set of beam groups; and communicating with a terminal node based on the transmitted information. In some embodiments, the method may further comprise determining a first time offset or a second time offset, the first time offset being associated with a transmission configuration indicator state change within a same beam group of the set of beam groups and the second time offset being associated with a transmission configuration indicator state change between different beam groups of the set of beam groups; and transmitting, to the terminal node, information identifying the determined first time offset or second time offset.

In a fifth aspect, an apparatus is provided. The apparatus comprised means for performing a method of the third or fourth aspect.

In a sixth aspect, a non-transitory computer readable medium comprising program instructions store thereon, which when executed by an apparatus, cause the apparatus to perform a method of the third or the fourth aspect.

Embodiments that do not fall under the scope of the claims are to be interpreted as examples useful for understanding the disclosure.

BRIEF DESCRIPTION OF THE DRAWINGS

For proper understanding of example embodiments, reference should be made to the accompanying drawings, wherein:

FIG. 11a illustrates an example block diagram of an apparatus, according to an embodiment; and FIG. 11b illustrates an example block diagram of an apparatus, according to another embodiment.

DETAILED DESCRIPTION

Figure 1:
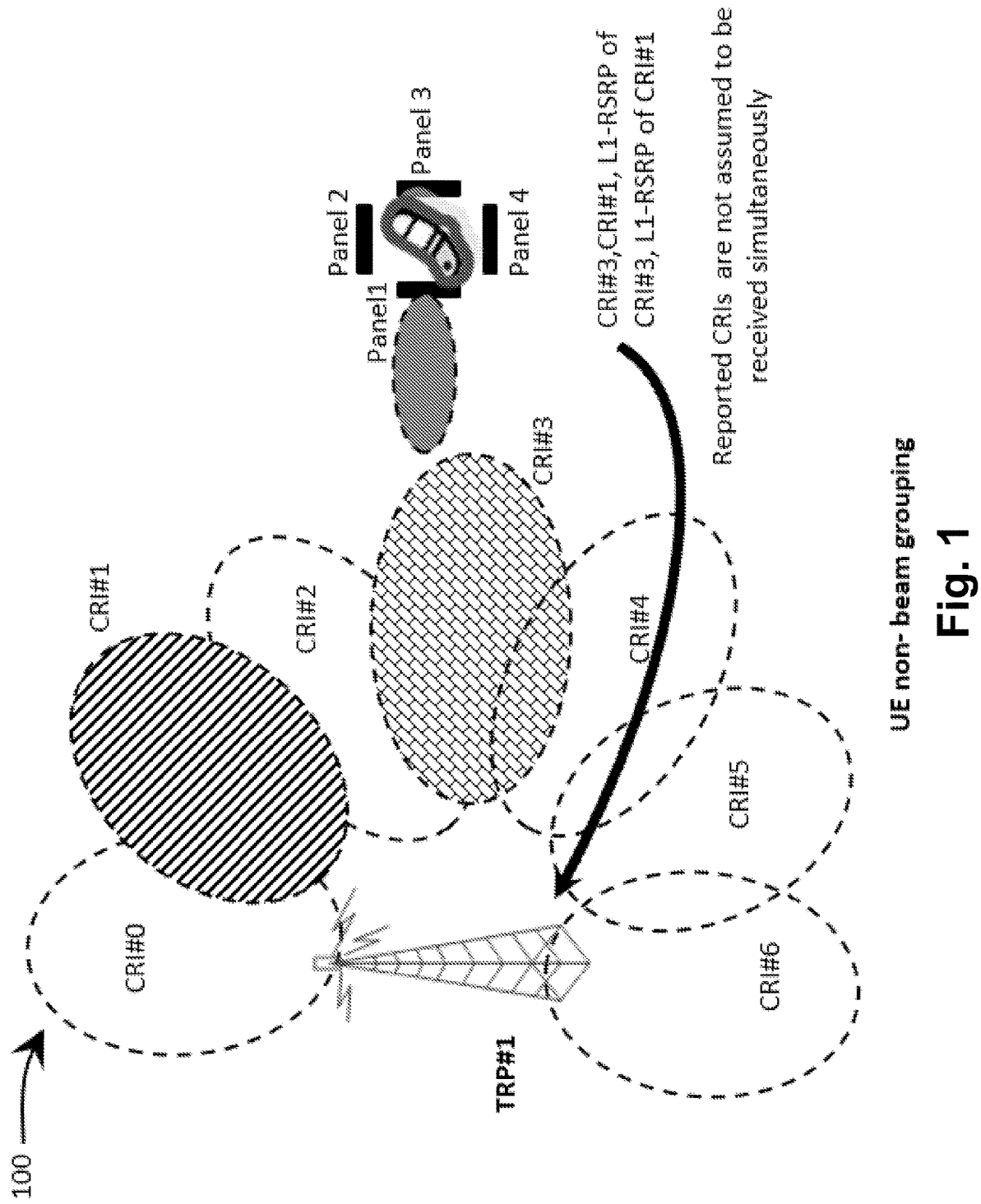
FIG. 1 illustrates an example of a non-group beam reporting scheme.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam group-based downlink (DL) transmit (TX) beam indication is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR may include physical layer design for multiple input multiple output (MIMO) enhancements. More specifically, NR may include a DL beam indication framework for scenarios with multiple TRPs and UEs equipped with multiple antenna panels. Certain further enhancements to NR may relate to quasi-co-location (QCL)/TCI-related enhancements to enable inter-cell multi-TRP operations, assuming multi-downlink control information (DCI)-based multi-PDSCH reception. Additionally, or alternatively, certain further enhancements may relate to beam-management-related enhancements for simultaneous multi-TRP transmission with multi-panel reception. Certain embodiments described herein may relate to these further enhancements.

In a communication system (e.g., 3GPP NR) according to some embodiments of the present disclosure, the UE may be configured with a set of candidate transmit beams for downlink control channel (e.g., physical downlink control channel (PDCCH)) and downlink data channel (e.g., PDSCH) reception. The configuration may be implemented as a table where each row may represent one transmit beam with its parameter(s). For example, for the PDCCH reception, the UE may be configured with a table where, either for each control resource set (CORESET) or search space, there is an associated downlink reference signal (RS) resource corresponding to a transmit beam. The CORESET or search space configuration may indicate a time-domain pattern for indicating when to assume that a certain TX beam may be used for PDCCH transmission, and, thus, the UE would be able to set its receive (RX) beam properly for the certain PDCCH blind detection occasion.

For the PDSCH reception, the UE may be configured with a table where each table index is associated with a certain DL reference signal (RS), e.g., a demodulation reference signal (DMRS) or a non-zero-power channel state information reference signal (NZP-CSI-RS), corresponding to a certain transmit beam. Scheduling PDCCH may then provide the UE with the index to indicate which TX beam is used for PDSCH transmission, in a dynamic manner.

The UE may be configured with transmit beams belonging to one or multiple TRPs of a cell. One example of the TCI states table of a UE in a radio resource control (RRC) connected state may be as shown in Table 1.

TABLE 1

Indicator table for QCL association between DL RS and demodulation reference signal (DMRS) of NR-PDSCH

| Indicator state | RS set (configured RS set TX beam RS is included in) | RS type | RS index (characterizes TX beam) |
|---|---|---|---|
| '000' | SS blocks of the cell | SS block | SS block index #3 |
| '001' | SS blocks of the cell | SS block | SS block index #4 |
| '010' | CSI-RS res. set #A | Periodic CSI-RS | CRI #2 (of set #A) |
| '011' | CSI-RS res. set #C | Periodic CSI-RS | CRI #1 (of set #C) |
| '100' | CSI-RS res. set #D | Aperiodic CSI-RS | CRI #0 (of set #D) |
| ... | ... | ... | ... |
| 'int2bin(M-1)' | ... | ... | ... |

The UE may be configured with multiple candidate TX beams of different types that may be characterized by (detected and measured by the UE): a synchronization signal (SS) block (SSB) beam, a periodic channel state information (CSI)-RS, or an aperiodic CSI-RS-based beam. NR-PDCCH that schedules NR-PDSCH may indicate, in DCI, the used indicator state for NR-PDSCH.

To support NR-PDCCH monitoring in the case of multiple candidate TX beams for NR-PDCCH with different monitoring periodicities (duty cycles), one possibility may be to configure a UE with one CORESET and, for example, two search spaces with different periodicities, where each search space may be associated with a certain TX beam for NR-PDCCH transmission. On the other hand, it may be possible to configure different CORESETs for the UE with different periodicities, and the search spaces may follow a periodicity of a corresponding CORESET. Example of configured QCL tables associating DL RS indexes and DMRSs of NR-PDCCH and PUCCH/PUSCH are provided in Tables 2 and 3, respectively.

TABLE 2

Configuration (Config.) table for QCL association between DL RS and DMRS of NR-PDCCH

| Config. Index | CORESET Config. | Search Space Config. | RS set (configured RS set TX beam RS is included in) | RS index (characterizes TX beam) | Note |
|---|---|---|---|---|---|
| '000' | CORESET #0 | Search Space Set #0 | CSI-RS set #A | CRI #2 (of set #A) | Monitoring pattern of search space (e.g., slots except every 5th slot) |
| '001' | CORESET #0 | Search space Set #1 | SS blocks of the cell | SS block #3 | Periodicity of search space (e.g., every 5th slot) |

TABLE 3

Indicator table for QCL association between RS and DMRS of NR-PUCCH/NR-PUSCH

| Indicator state | RS set | RS type | RS index |
|---|---|---|---|
| '000' | SRS resource set #A | Periodic SRS | SRI #2 (of resource set A) |
| '001' | SRS resource set #B | Aperiodic SRS | SRI #1 (of resource set B) |
| '010' | SS blocks of a cell | SS block | SS block #3 |
| '011' | CSI-RS res. set #C | Periodic CSI-RS | CRI #1 (of set #C) |

A communication system (e.g., NR) may provide support for both UE non-group and group-based beam reporting schemes. FIG. 1 illustrates an example of a non-group beam reporting scheme (e.g., an example 100 of non-beam group-based reporting with non-zero-power (NZP)-CSI-RS resources). The network may configure CSI-reporting with up to four CSI-RS resource indicators (CRIs) with layer 1 (L1)-reference signal receive power (RSRP) values to be reported. Here, for simplicity, only two CRIs are shown when the network configures beam reporting to be non-group-based reporting, and the UE may not be assumed to receive simultaneously with one or more spatial filter(s) reported CRIs associated with L1-RSRP values. When a TX beam switch occurs among reported CRIs, some extra time may have to be reserved to enable the UE to change its RX beam and/or antenna panel accordingly. As a result of this, the scheduling flexibility of the network may be limited and the beam group-based reporting can be used.

Figure 2:
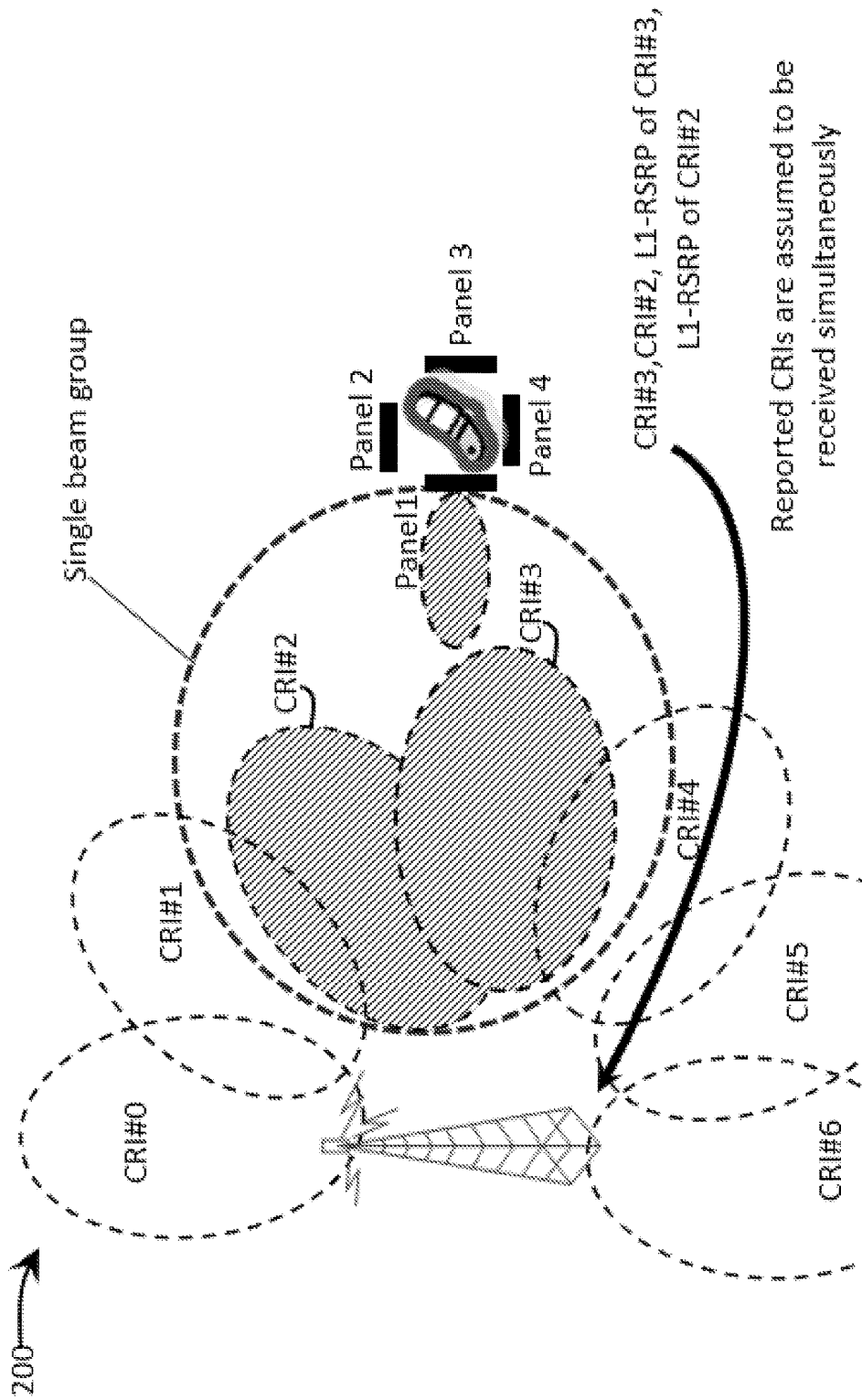
FIG. 2 illustrates an example of a group-based reporting scheme without spatial multiplexing.

FIG. 2 illustrates an example of a group-based reporting scheme without spatial multiplexing (e.g., an example 200 of beam group-based reporting with NZP-CSI-RS resources with UE beam grouping) in a communication system. In this example, the UE may be assumed to receive, simultaneously with one spatial filter, up to four CRIs (e.g., 1, 2, 4 CRIs). Here, for simplicity, only two CRIs are shown. Since multiple CRIs can be received with a single with one spatial filter, no extra time has to be reserved when a TX beam change occurs within the beam group. As a result of this, the scheduling restrictions of a network can be reduced.

Figure 3:
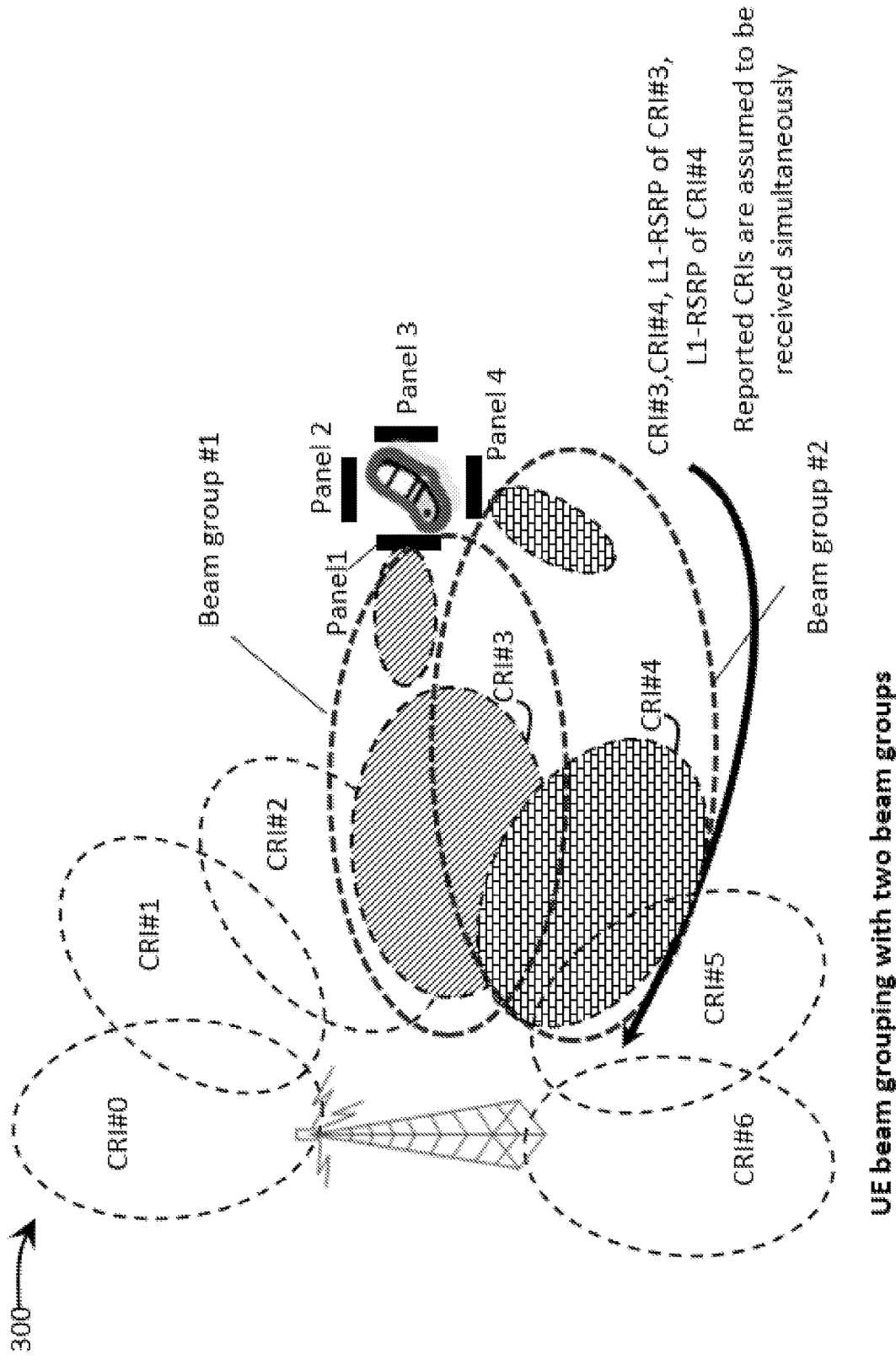
FIG. 3 illustrates an example of a group-based beam reporting scheme with spatial multiplexing.

FIG. 3 illustrates an example 300 of a group-based beam reporting scheme with spatial multiplexing in a communication system. To enhance, further, the spatial multiplexing capability of simultaneous downlink multi-beam transmission, the network may configure UE beam reporting with two CRIs, as depicted in FIG. 3. Here, it may be assumed that a UE has a capability to use at least two active antenna panels and/or spatial filters for the simultaneous reception. As a result of this, two different downlink TX beams associated with CRIs can be received simultaneously. A network may be UE antenna panel and beam agnostic. In addition, the number of active UE antenna panels may be determined by the UE reception capability. The network may not define a way to distinguish which of two beam group reporting derivatives is used.

Regarding CSI report settings for beam management, both non- and differential-based reporting for both non-group and group-based beam reporting may be supported in NR. A reporting format may be reused among non-group-based and group-based schemes. Differential reporting may aim to reduce CSI reporting overhead by utilizing differential encoding. When the number of reported CRIs is larger than one, differential reporting may be used. A network may define that a 7 bit-length field is reserved to indicate quantized measured L1-RSRP between the largest and smallest L1-RSRP value (e.g., −140 decibel-milliwatts (dBm) to −44 dBm). Additionally, 4 bit-length fields may be reserved to indicate differentially coded L1-RSRP values with respect to the maximum value, with 2-bit step-size. Furthermore, the network can configure up to 4 CRIs or SSB resource indicators associated with L1-RSRP values to be reported.

A communication system may provide support for DL multi-beam PDSCH transmission with multiple TRPs. Depending on the capability of a UE, two TCI states can be configured for a codepoint of the downlink control information (DCI) field. An enhanced MAC CE activation/deactivation command may be used to map up to 8 combinations of one or two TCI states to the codepoints of the DCI field.

Figure 4:
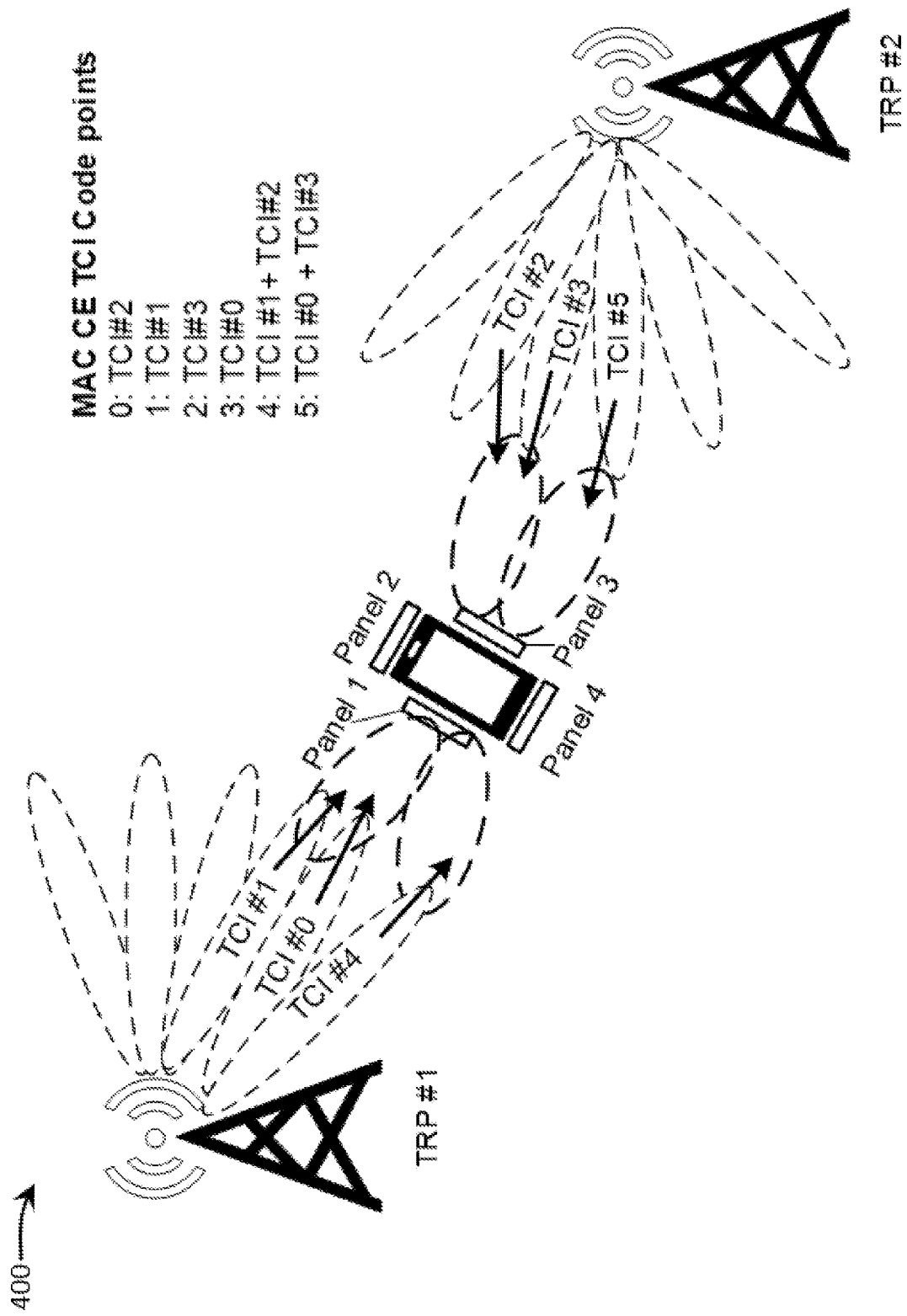
FIG. 4 illustrates an example of simultaneous physical downlink shared channel (PDSCH) transmission from two transmission reception points (TRPs)

FIG. 4 illustrates an example 400 simultaneous PDSCH transmission from two TRPs. In this example, the network may have triggered a NR enhanced MAC activation command with 6 different TCI states that are mapped to the codepoints of the TCI field in DCI with PDCCH. For example, when the TCI field is set to 4, the UE may assume that simultaneous TX beam transmission, with PDSCH associated with two TCI states 1 and 2 from TRP1 and TRP2, respectively, is scheduled with a scheduling time offset associated with the reception of PDCCH and PDSCH transmission occasions. Based on the indicated DCI codepoint and related TCI states, the UE may use two different RX spatial filters for the indicated simultaneous transmission.

A DL TX beam indication framework (e.g., TCI framework) may need to provide mechanisms and/or UE procedures that would enable efficient utilization of beam grouping-based DL TX indication without spatial multiplexing. Even though a communication system may provide support for beam grouping-based reporting, a network may not be able to utilize already specified beam reporting methods efficiently in its operation. By enabling support for beam group based reporting without and with spatial multiplexing, the network can reduce TX beam switching latency as well as reduce TX beam scheduling restrictions in the context of DL beam indication. NR may not define such signaling mechanisms and UE procedures that enable efficient DL TX beam indication by leveraging of beam group-based reporting without spatial multiplexing. Therefore, there is a need to develop further signaling mechanisms and UE procedures for beam group-based reporting DL TX beam indication framework for both below and above 52.6 gigahertz (GHz) operations.

Some embodiments described herein may provide for beam group-based DL transmit TX beam indication. Specifically, certain embodiments may provide enhancements related to physical layer design for MIMO and/or enhancements for a beam indication framework for scenarios with multiple TRPs and UEs equipped with multiple antenna panels. As such, certain embodiments may address some further enhancement(s) described above.

Broadly, certain embodiments described herein may include indicating, implicitly or explicitly to a UE, that activated TCI states are associated with a set of beam groups. In an example embodiment, a reserved (R) bit in an activation/deactivation command (e.g., MAC CE) may provide such indication explicitly (e.g., one or more reserved bits may indicate that one or more activated TCI states may be associated with a set of beam groups). Alternatively, or additionally, a beam group configuration signaling (which may indicate, for example, the number of beam groups, or group size (i.e., the number of beams in a beam group)), if received, may provide such indication implicitly. Upon receiving the implicit/explicit indication, the UE may assume that the activated TCI states indicated in the command are associated with beam group-based reporting. The association of a TCI state with a beam group may be determined based on the activation/deactivation command, and the beam group configuration (e.g., group size). For example, if 4 TCI states are activated, and the group size is 2, then the first 2 TCI states may be associated with one beam group, while the last 2 TCI states may be associated with another beam group.

The number of beam groups (which may be part of a beam group configuration) may be indicated implicitly or explicitly to UE. The grouping of beams may be based on spatial domain reception properties (e.g. direction of spatial domain RX filter) of the RS, or a latency in switching the beam at the UE. The UE may assume that a TCI state change within a same beam group may be associated with an indication time offset (which may be denoted as offset-intra-beam-group) and/or the direction of spatial domain RX filter(s) may be the same for TCI states within a same beam group. The UE may assume that a TCI state change between beam groups is associated with another time offset (which may be denoted as offset-inter-beam-group) and/or the direction of spatial domain RX filter(s) may be different for TCI states in different beam groups. The offset-intra-beam-group may be smaller than the offset-inter-beam-group. A set of TCI states associated with the offset-intra-beam-group may be implicitly re-associated with the offset-inter-beam-group, if a group report for the set of TCI states is not updated for a time interval that satisfies a threshold value configured by a network.

More specifically, certain embodiments described herein may provide for an enhanced DL TX beam indication framework for beam grouping-based reporting that enables reduced TX beam switching latency and scheduling restrictions with multi-beam transmission in a single or multi-TRP scenario. Conditions for the gNB DL TX beam may be introduced, for TX beams belonging to the same group, for which the beam switching application time may be made shorter than for the beam switching among the beams belonging to the different groups. For the latter case, a longer switching time can be applied.

In some embodiments, a beam group-based reporting-related indication mechanism for PDCCH and PDSCH may be defined. Upon the reception of TCI state activation/deactivation/indication (e.g., MAC CE) command for beam grouping associated with PDSCH or PDCCH, the UE may assume that the indicated TCI states associated with a single codepoint with DCI, or TCI states associated with the MAC CE, are associated with beam group-based reporting with and/or without spatial multiplexing.

The number of beam groups associated with activated TCI states can be implicitly or explicitly indicated for a UE. For implicit indication, the UE may assume that activated TCI states can be divided into a set of beam groups by, for example, dividing the number of activated states by the number of reported reference signal resources per beam report in CSI reporting instance. The UE may assume that the ordering of grouped activated TCI states is determined in ascending order from the lowest to highest TCI state identifier, where the highest TCI state identifier may correspond to a RS which may be part of the same group. For explicit indication, the UE may be explicitly informed about the number of beam groups among activated TCI states. In this case, the indication can be performed, for example, via RRC signalling, a MAC CE, or physical layer signalling.

The UE may assume that activated TCI states with beam grouping are associated with two different time offsets related to TX beam indication for DMRS of PDSCH, DMRS of PDCCH, non-zero-power channel state information reference signal (NZP-CSI-RS), demodulation reference signal (DMRS), or SSB. The UE may assume that a TCI state change within a beam group is associated with an indication time offset (the offset-intra-beam-group). Alternatively, the offset-intra-beam group may be utilized by the UE in the case where the beams are not grouped according to UE spatial RX filter direction, but the UE considers them as being part of the same latency group. In other words, the criteria for beam grouping may not be the spatial reception properties of the RS, but the latency in switching the beam at the UE (irrespective of the direction of spatial RX filter(s)). For example, it may be possible to have a situation where latency associated with UE antenna panels is different between antenna panels. The indication time offset may define the time duration in symbols/slots between the reception of a TX beam associated with a signal/RS/channel and transmission of a TX beam associated with a signal/RS/channel within a beam group where the channel can be PDSCH and/or PDCCH. Alternatively, intra-beam indication time offset may be associated with a time threshold value.

When an active TCI state of a CORESET for PDCCH is a part of a beam group for a TCI state of the scheduled PDSCH, the UE may assume that the intra-beam group scheduling offset is used for PDSCH scheduling. When a beam group condition holds for TCI states associated with scheduled DL transmission, intra-beam group scheduling offset can be used for any DL reference signal resource, for example, NZP-CSI-RS for beam management (BM), NZP-CSI-RS for CSI acquisition, DMRS, phase tracking RS (PTRS), and/or NZP-CSI-RS for time and frequency tracking, and/or positioning reference signal (PRS), and/or SSB.

The UE may assume that a TCI state change between beam groups is associated with an indication time offset (the offset-inter-beam-group). The time offset may define the time duration in symbols/slots between the reception of a signal/RS/channel associated with TX beam and transmission of a signal/RS/channel associated with TX beam from different beam groups where the channel can be, for example, PDSCH and/or PDCCH. Alternatively, inter-beam group time offset may be associated with a time threshold value. The UE may assume that the indication time offset within a beam group (offset-intra-beam-group) is shorter in time with respect to the indication time offset between beam groups (the offset-inter-beam-group). In other words, a value of offset-intra-beam-group may be less than that of the offset-inter-beam-group. To enable the network to configure UE-specific indication time offsets for beam group-based DL TX beam indication, it may be assumed that the UE indicates these two scheduling offsets for the network as a part of UE capability information signalling. In certain embodiments, TCI states that are associated with the offset-intra-beam-group may be implicitly re-associated with the offset-inter-beam-group if the amount of time since the last beam group report to update those TCI states has exceeded a time threshold value.

In this way, certain embodiments may enable leveraging of beam grouping methods under a DL TX beam indication framework. In addition, certain embodiments may enable enhancement of system operation with multiple TRPs and multiple DL TX beams. This may reduce beam switching times and/or may reduce scheduling restrictions. In addition, this may increase an efficiency of spatial multiplexing.

Figure 5:
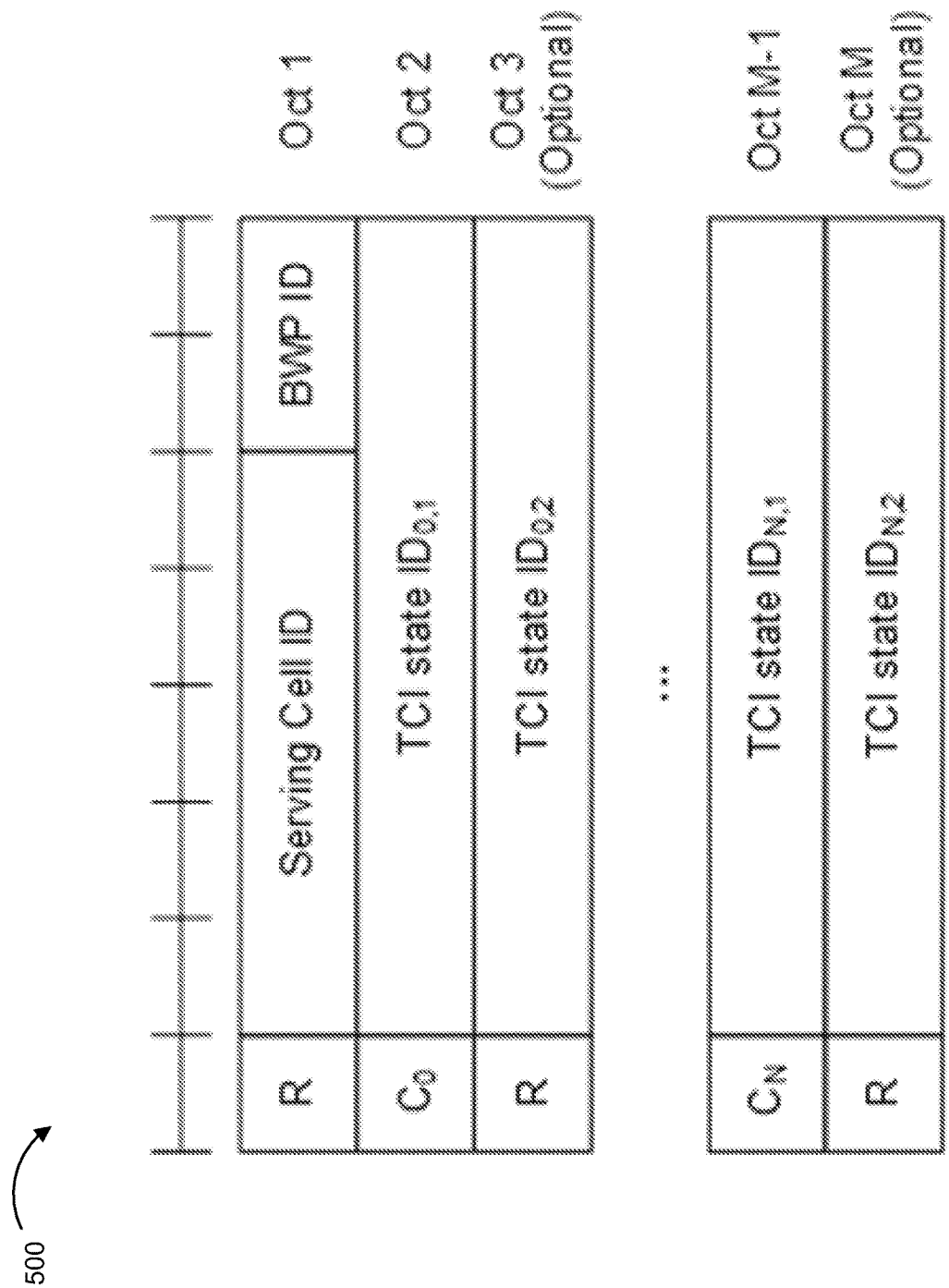
FIG. 5 illustrates an example of a medium access control (MAC) control element (CE) for enhanced transmission configuration indicator (TCI) states activation/deactivation for UE-specific PDSCH, according to some embodiments.

FIG. 5 illustrates an example of a MAC CE for enhanced TCI states activation/deactivation for UE-specific PDSCH, according to some embodiments. For example, FIG. 5 illustrates an example 500 of an implementation of the TCI state activation/deactivation for beam grouping by using an enhanced state activation/deactivation MAC CE. The content of the MAC CE may include a serving cell identifier (serving cell ID). This field may indicate the identity of the serving cell for which the MAC CE applies. The length of the field may be 5 bits. Additionally, or alternatively, the content of the MAC CE may include a bandwidth part (BWP) identifier (BWP ID). This field may indicate a DL BWP for which the MAC CE may apply as the codepoint of the DCI bandwidth part indicator field. The length of the BWP ID field may be 2 bits.

The content of the MAC CE may include a bit field $C_i$. When using beam group-based DL indication with spatial multiplexing or without spatial multiplexing with the same MAC CE, setting the $C_i$ field to 1 or 0 differentiates whether activated TCI state(s) for a code point is/are used for spatial multiplexing or without spatial multiplexing. This field may indicate whether the octet containing a TCI state identifier ($ID_{i,2}$) is present. If this field is set to "1," the octet containing the TCI state $ID_{i,2}$ may be present. If this field is set to "0," the octet containing the TCI state $ID_{i,2}$ may not be present. The MAC CE content may include a TCI state identifier ($ID_{i,j}$). This field may indicate the TCI state identified by a TCI-State ID parameter, where i may be the index of the codepoint of the DCI Transmission configuration indication field, and TCI state $ID_{i,j}$ may denote the j-th TCI state indicated for the i-th codepoint in the DCI transmission configuration indication field. The TCI codepoint to which the TCI states are mapped may be determined by its ordinal position among the TCI codepoints with sets of TCI state $ID_{i,j}$ fields (e.g., the first TCI codepoint with TCI state $ID_{0,1}$ and TCI state $ID_{0,2}$ may be mapped to the codepoint value 0, the second TCI codepoint with TCI state $ID_{1,1}$ and TCI state $ID_{1,2}$ may be mapped to the codepoint value 1, and so on). The TCI state $ID_{i,2}$ may be optional based on the indication of the $C_i$ field. The maximum number of activated TCI codepoints may be 8 and the maximum number of TCI states mapped to a TCI codepoint may be 2. The MAC CE content may include reserved (R) bits. When a reserved bit is set to "1," the MAC CE may be used for beam grouping without spatial multiplexing. When the reserved bit is set "0," the MAC CE may be used for beam grouping with spatial multiplexing or without beam grouping depending on values associated with bit field $C_i$.

As described above, FIG. 5 is provided as an example. Other examples are possible, according to some embodiments.

Figure 6:
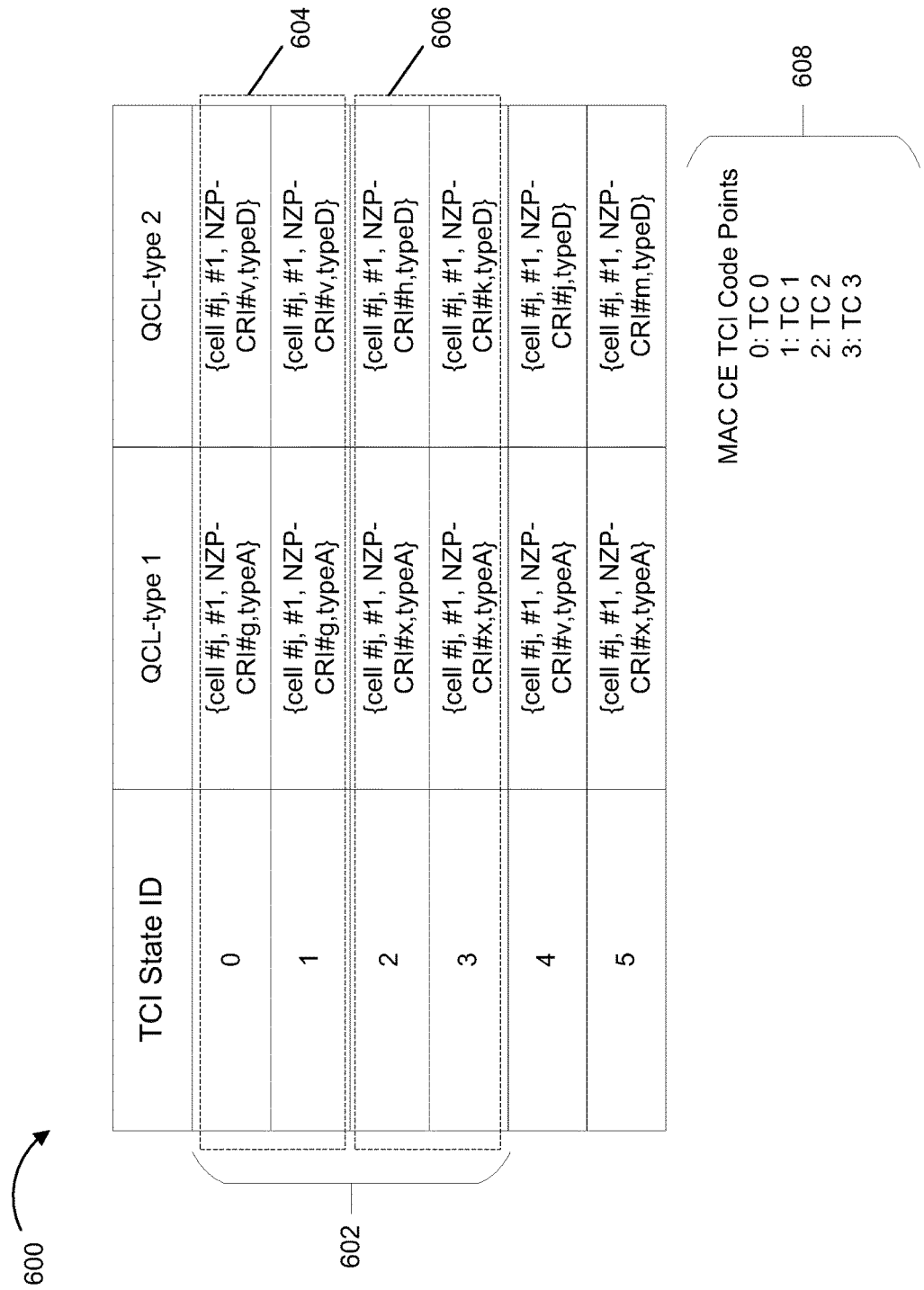
FIG. 6 illustrates an example of TCI state activation for beam grouping-based DL TX beam indication with MAC CE, according to some embodiments.

FIG. 6 illustrates an example of TCI state activation for beam grouping-based DL TX beam indication with MAC CE, according to some embodiments. For example, FIG. 6 illustrates an example 600 of beam group-based DL beam indication. An enhanced MAC CE TCI state activation command may be used to activate four TCI states (as illustrated at 602 (states for TCI state IDs 0-3)) for beam group based operation. The UE may be configured with two beam groups implicitly or explicitly. As illustrated at 604, a subset of the TCI states (with TCI state IDs 0 and 1) may be associated with a first beam group (beam group #1). As illustrated at 606, a subset of the TCI states (with TCI state IDs 2 and 3) may be associated with a second beam group (beam group #2). As described below and elsewhere herein, the number of beam groups can be determined based on implicit or explicit indication. A MAC CE may activate TCI states 0-3 for codepoint indication via DCI with the assumption of beam group-based reporting. As illustrated at 608, MAC CE TCI codepoints may be determined. The offset-intra-beam-group and the offset-inter-beam-group may be applied. DL Tx beam switching within a beam group may be enabled with an indication time offset (offset-beam-group), where the offset-intra-beam-group is less than the offset-inter-beam-group for DL TX beam switching between beam groups. The various offsets may be configured according to the UE's capability.

Upon the reception of an enhanced TCI activation/deactivation MAC CE associated with PDSCH, the UE may re-interpret a reserved bit field so that the UE can determine whether the MAC CE indicates beam grouping-based DL TX beam indication. When a reserved bit field is configured to 1 (R fields may have the same value in MAC CE entry) and the $C_i$ field set to 0, the UE may assume that the activated/deactivated TCI state for the target DMRSs of PDSCH/DMRS of PDCCH/NZP-CSI-RSs/PTRS/PRS/SSB is associated with DL TX-RX beam pairs obtained via beam group-based reporting without spatial multiplexing. The UE may be indicated, implicitly or explicitly, about the number of beam groups or a size of a beam group. For implicit indication, the UE may assume that activated TCI states are divided into single or multiple beam groups, by dividing the number of activated TCI states by the number of reported reference signal resources per beam reporting instance. The UE may assume that the ordering of activated TCI states is determined in ascending order from the lowest to highest TCI state ID. Alternatively, the number of beam groups, or the size of a beam group, may be explicitly indicated for the UE via RRC signalling, MAC CE, or physical layer signalling.

In some embodiments, the UE may assume that activated TCI states with beam grouping are associated with two different time offsets related to TX beam indication for DMRS of PDSCH, DMRS of PDCCH, NZP-CSI-RS, PTRS, PRS, SSB. When the change of the TCI state within a beam group for DMRS of PDSCH, DMRS of PDCCH, NZP-CSI-RS, PTRS, PRS, and/or SSB is indicated and detected at UE-side, the UE may assume that there is a time offset in symbols/slots between the reception of a TX beam and transmission of a TX beam within a beam group for DMRS of PDSCH, DMRS of PDCCH, NZP-CSI-RS, PTRS, PRS, and/or SSB. This time offset may be referred to as intra-beam group time offset (the offset-intra-beam-group). Similarly, when the change of the TCI state between different beam groups for DMRS of PDSCH, DMRS of PDCCH, NZP-CSI-RS, PTRS, PRS, and/or SSB is indicated and detected at the UE-side, the UE may assume that there is a time offset in terms of symbols/slots between the reception of a TX beam associated with signal/RS/channel and transmission of a TX beam associated with a signal/RS/channel between different beam groups. This time offset may be referred to as inter-beam group time offset (e.g., offset-inter-beam-group). Furthermore, in some embodiments, the UE may assume that the intra-beam-group time offset is shorter in time relative to the inter-beam-group time offset.

As described above, FIG. 6 is provided as an example. Other examples are possible, according to some embodiments.

Figure 7A:
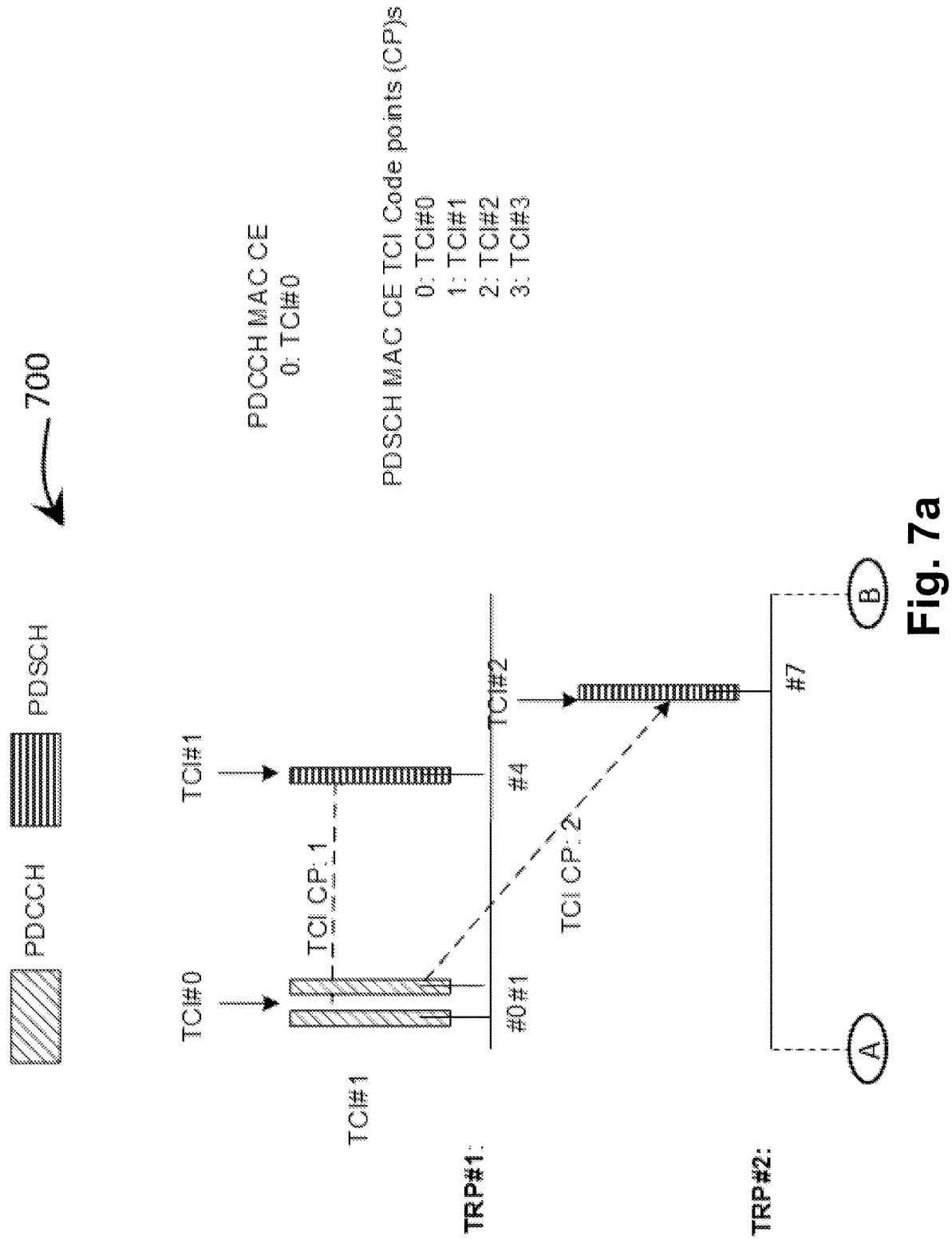
FIG. 7a illustrates part of an example of TX beam scheduling time offsets associated with TX beam change within a beam group and between beam groups, according to some embodiments.
Figure 7B:
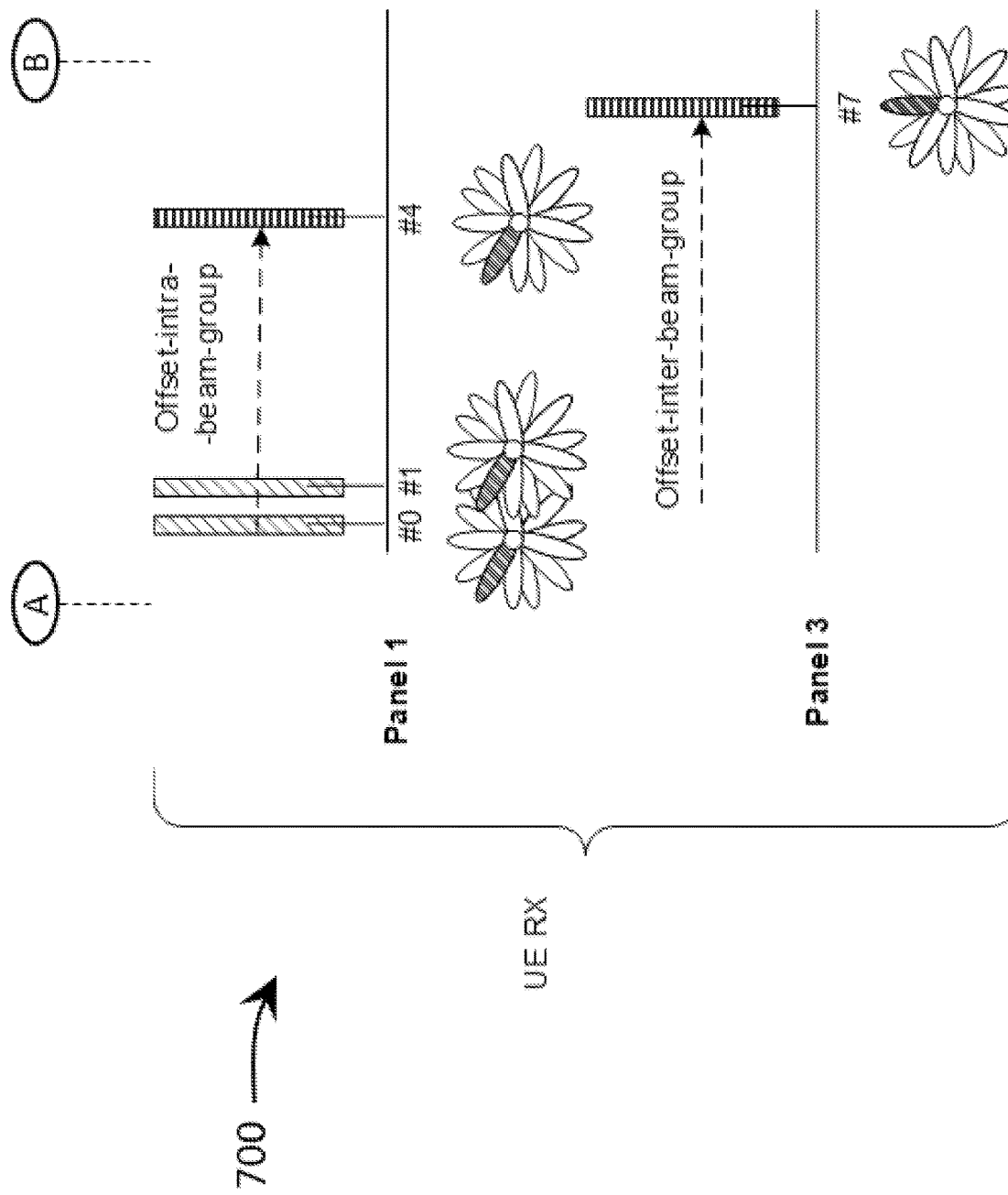
FIG. 7b illustrates a remaining part of the example of TX beam scheduling time offsets associated with TX beam change within a beam group and between beam groups, according to some embodiments.

FIGS. 7a and 7b illustrate parts of an example of TX beam indication time offsets associated with a TX beam change within a beam group and between beam groups, according to some embodiments. For example, FIGS. 7a and 7b depict an example 700 of different TX beam indication time offsets associated with TCI states for beam group-based DL TX indication with two TRPs. This example refers to the scenario depicted in, and described with respect to, FIG. 4. As is illustrated in FIGS. 7a and 7b, the active TCI state of a CORESET for PDCCH (TCI #0) may be associated with TRP #1. When PDCCH with active TCI state #0, with DCI for TCI code point (CP) 0, schedules PDSCH transmission with TCI #1, the UE may assume that the TCI state of PDCCH (TCI #0) and the TCI state of PDSCH (TCI #1) may be part of the same beam group.

Due to beam grouping, the UE may assume to use the same RX beam direction for the reception of both the DMRS of PDCCH and DMRS of PDSCH associated with TCI #0 and TCI #1 states, respectively. After the UE has received PDCCH, the transmission of the PDSCH may be started with the intra beam group scheduling offset (the offset-intra-beam-group). Since another PDSCH transmission that is scheduled for TRP #2 associated with TCI state TCI #2 may not be part of the same beam group as an active TCI state of PDCCH, the UE may assume that the indication time offset for PDSCH transmission with TCI #2 utilizes an inter beam group offset with a longer time compared with intra beam group offset.

Another example for the use of the proposed beam group-based DL indication can be provided in the context of a DL TX beam diversity method supported in NR. To enable faster DL TX beam switching/cycling among configured TCI states associated with DMRS of PDSCH, DMRS of PDCCH, NZP-CSI-RS, PRS, PTRS, or SSB, certain embodiments described herein can enable faster TX beam switching diversity with TCI states within beam groups. This may be beneficial in some uses cases, such as ultra-reliable low-latency communication (URLLC) applications, industrial IoT applications, and/or the like.

As described above, FIGS. 7a and 7b are provided as examples. Other examples are possible according to some embodiments.

Figure 8:
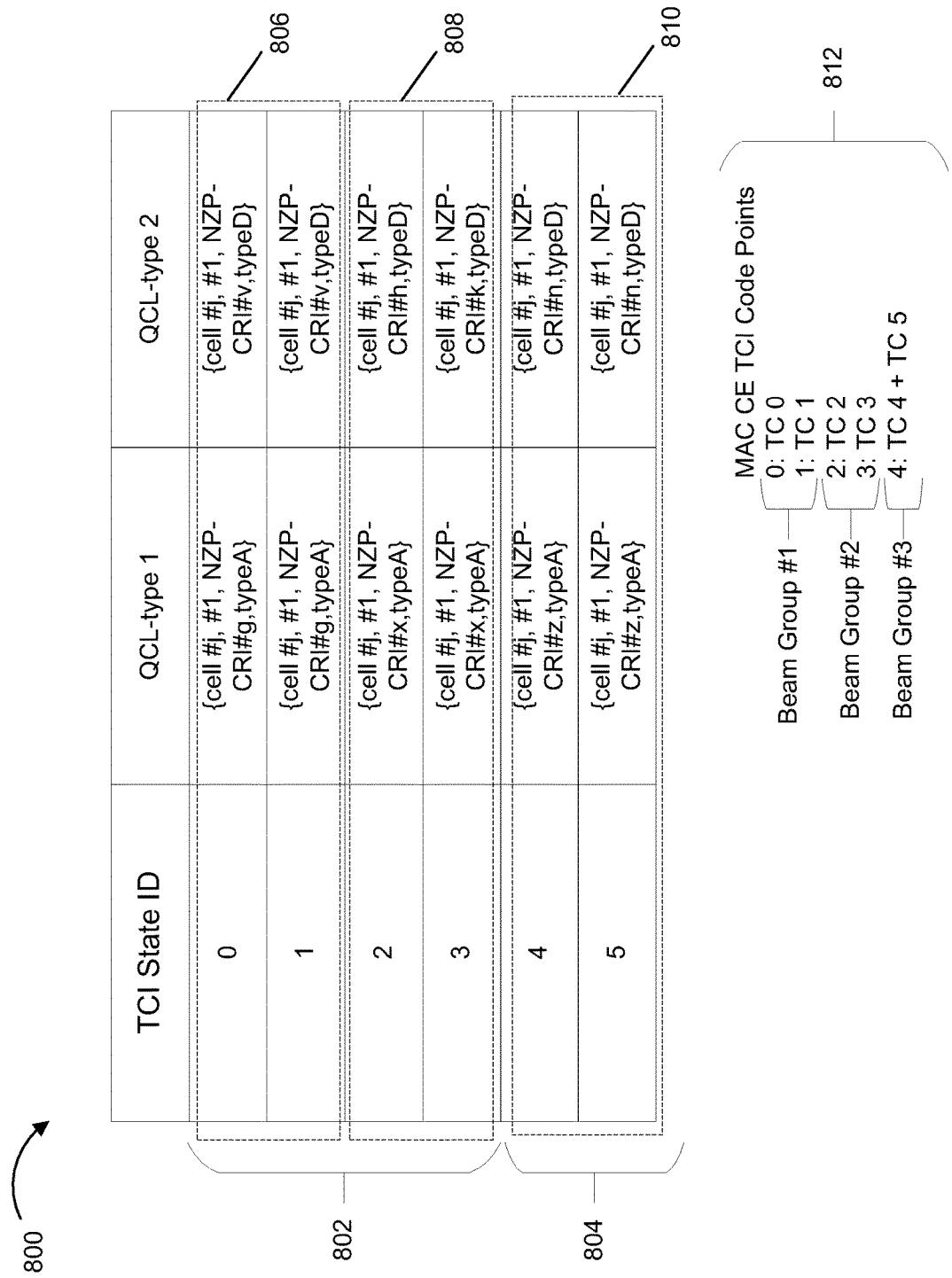
FIG. 8 illustrates an example of beam group-based DL TX beam indication with and without spatial multiplexing, according to some embodiments.

FIG. 8 illustrates an example of beam group-based DL TX beam indication with and without spatial multiplexing, according to some embodiments. For example, FIG. 8 illustrates an example 800 of beam group-based DL TX beam indication with and without spatial multiplexing. Upon the reception of a NR-enhanced TCI activation/deactivation MAC CE associated with PDSCH, the UE may re-interpret a reserved bit field to determine whether it indicates that beam grouping-based DL TX beam indication is to be configured or not.

As illustrated at 802 and 804, a NR enhanced MAC CE TCI state activation command may be used to activate two sets of TCI states for a total of six TCI states (states for TCI state IDs 0-5) for beam group-based operation. A MAC CE may activate TCI states 0-5 for code point indication via DCI, with an assumption of beam group-based TX-RX beam pair identification. Assume that the UE is configured with 3 beam groups in this example. As illustrated at 806, a first subset of the TCI states (with TCI state IDs 0 and 1) may be associated with a first beam group (beam group #1). As illustrated at 808, a second subset of the TCI states (with TCI state IDs 2 and 3) may be associated with a second beam group (beam group #2). As illustrated at 810, a third subset of the TCI states (with TCI state IDs 4 and 5) may be associated with a third beam (beam group #3). The number of beam groups may be determined based on implicit or explicit indication. Indication time offsets between the beam groups and within the beam groups may be applied, as described elsewhere herein. As illustrated at 812, MAC CE TCI codepoints may be determined for the different beam groups.

When a reserved bit field is configured to 1 and a $C_i$ field set to 0, the UE may assume that activated/deactivated TCI states with state $ID_i$ for target DMRSs of PDSCH/DMRS of PDCCH/NZP-CSI-RSs/PTRS/PRS/SSB are associated with DL TX-RX beam pairs obtained via beam group-based reporting without spatial multiplexing. When a reserved bit field is configured to 1 and a $C_i$ field is configured to 1, the UE may assume that activated/deactivated TCI with state $ID_i$ and TCI with state $ID_{i+1}$ forms a TCI state pair for target DMRSs of PDSCH/DMRS of PDCCH/NZP-CSI-RSs/PTRS/PRS/SSB. The target DMRSs/NZP-CSI-RSs/PTRS/PRS/SSB may be associated with DL TX-RX beam pairs obtained via beam group based-reporting with spatial multiplexing.

The association of TCI states with a set of beam groups may be indicated to UE in another way instead of the reserved bit. For example, the UE may determine implicitly that the activated TCI states are associated with beam groups or beam group-based reporting upon receiving a beam group configuration. The beam group configuration may indicate the number of beam groups or a size of a beam group.

Based on a TCI codepoint, the network may dynamically trigger different beam groups via the same DL TX beam indication framework. Furthermore, the network may leverage both of the beam grouping methods for efficient system operation, such as reduced beam switching times and reduced scheduling restrictions, as well as spatial multiplexing capability in multi-TRP operation with multiple DL TX beams.

As described above, FIG. 8 is provided as an example. Other examples are possible according to some embodiments.

Figure 9:
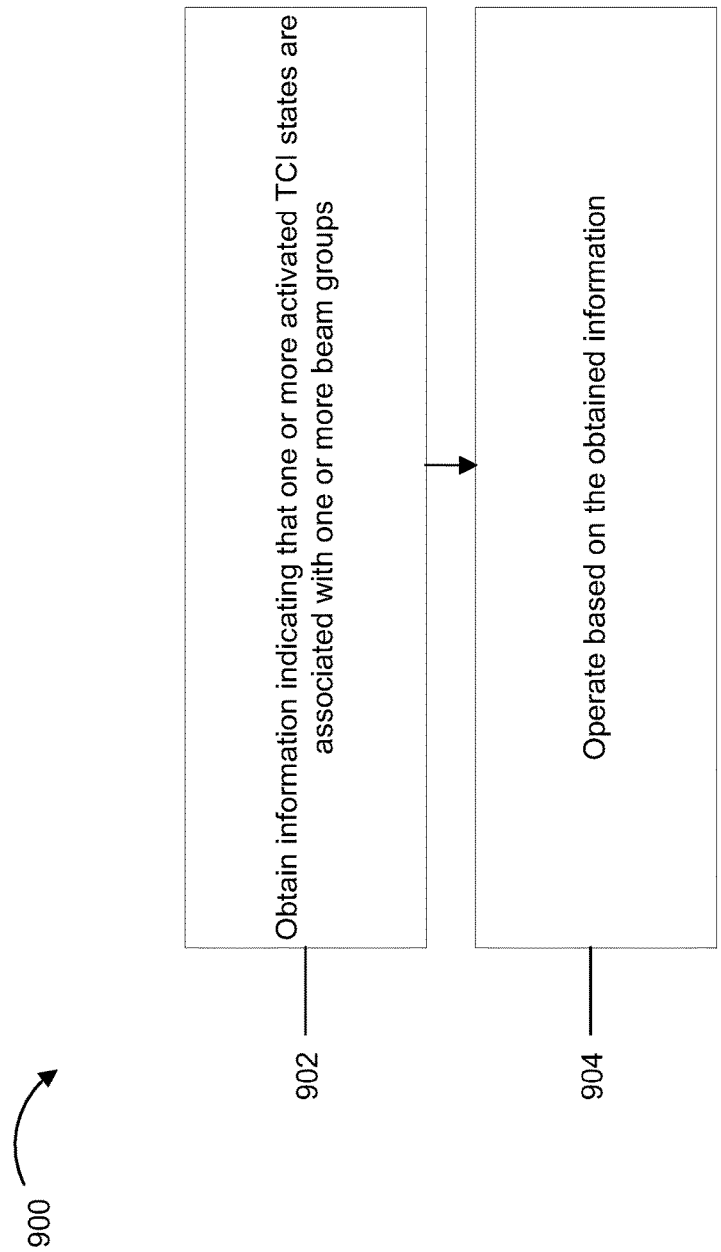
FIG. 9 illustrates an example flow diagram of a method, according to some embodiments.

FIG. 9 illustrates an example flow diagram of a method 900, according to some embodiments. For example, FIG. 9 shows example operations of a terminal node (e.g., apparatus 20 shown in FIG. 11*b*). Some of the operations illustrated in FIG. 9 may be similar to some operations shown in, and described with respect to, FIGS. 1-8.

In an embodiment, the method may include, at 902, obtaining information indicating that one or more activated TCI states are associated with a set of beam groups. The set of beam groups includes one or more beam groups. In an embodiment, the method may include, at 904, operating based on the obtained information.

In some embodiments, the information may be obtained explicitly from a command for activating or deactivating one or more TCI states. An example of the command is shown in FIG. 5. In some embodiments, the activation or deactivation command may include information (e.g., one or more reserved bits included in a MAC CE, RRC signaling, or physical layer signaling) for enabling or disabling an association of one or more TCI states with a set of beam groups. In some embodiments, alternatively, or additionally, the information may be obtained implicitly from beam group configuration signaling that may configure a number of beams per beam group included in the set of beam groups, or a number of beam groups included in the set of beam groups.

In some embodiments, operating based on the obtained information may include determining that the one or more activated TCI states are associated with beam group-based reporting for the set of beam groups. In some embodiments, operating based on the obtained information may include detecting a control signal (e.g., a DCI) indicting one of the one or more activated TCI states to use. In some embodiments, operating based on the obtained information may include determining whether the indicated one TCI state is associated with a same beam group as a previous TCI state in use. In some embodiments, operating based on the obtained information may include operating based on the determination of whether the indicated one TCI state is associated with the same beam group.

In some embodiments, operating based on the determination may include determining that a communication from a network node is to use a time offset associated with the same beam group, e.g., when the indicated one TCI state is determined to be associated with the same beam group. In some embodiments, operating based on the determination may include determining that the communication is to use one or more simultaneous spatial domain receive filters that are the same as the previous TCI state, e.g., when the indicated one TCI state is associated with the same beam group.

In some embodiments, operating based on the determining may include determining that a communication from a network node is to use a different time offset than a time offset used for a beam group of the pervious TCI state, e.g., when the indicated one TCI state is determined to be not associated with the same beam group. In some embodiments, operating based on the determining may include determining that the communication is to use one or more simultaneous spatial domain receive filters that are different from the previously indicated TCI state, e.g., when the indicated one TCI state may not be associated with the same beam group. In some embodiments, the method may further include, based on a group report for a TCI state being outdated, determining that the communication from the network node is to use a different time offset than a time offset associated with same beam group. In some embodiments, a beam group may be based on one or more spatial domain reception properties (e.g. spatial characteristics of a receive filter) or latency for a beam switch.

As described above, FIG. 9 is provided as an example. Other examples are possible according to some embodiments.

Figure 10:
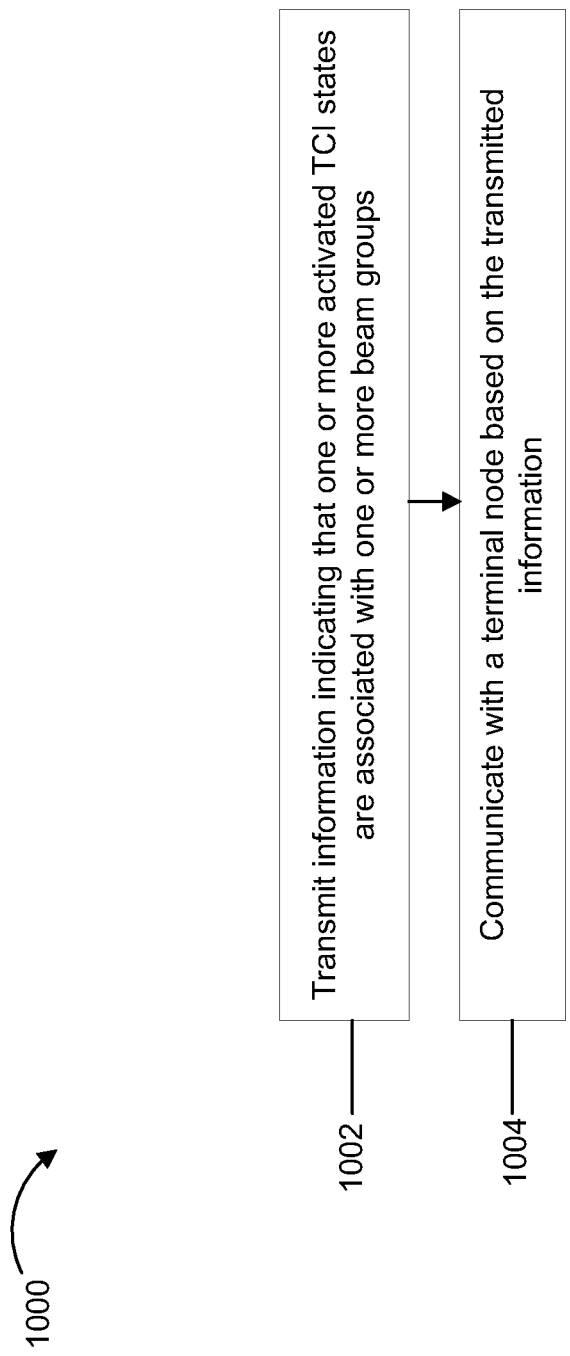
FIG. 10 illustrates an example flow diagram of a method, according to some embodiments.

FIG. 10 illustrates an example flow diagram of a method 1000, according to some embodiments. For example, FIG. 10 shows example operations of a network node (e.g., apparatus 10). Some of the operations illustrated in FIG. 10 may be similar to some operations shown in, and described with respect to, FIGS. 1-8.

In an embodiment, the method may include, at 1002, transmitting information indicating that one or more activated TCI states are associated with a set of beam groups. In an embodiment, the method may include, at 1004, communicating with a terminal node based on the transmitted information.

In some embodiments, the information may be transmitted explicitly in a command (e.g., RRC signaling, MAC layer signaling, or physical layer signaling) for activating or deactivating one or more TCI states. In some embodiments, the activation or deactivation command may include information for enabling or disabling an association of one or more TCI states with a set of beam groups. The information may encapsulate one or more R bits included in a MAC CE, RRC signaling, or physical layer signaling. In some embodiments, the information may be indicated implicitly in beam group configuration signaling that may configure a number of beams per beam group included in the set of beam groups, or a number of beam groups included in the set of beam groups.

In some embodiments, the method may include determining a first time offset for TCI state changes within a same beam group of the set of beam groups and a second time offset for TCI state changes between different beam groups of the set of beam groups. In some embodiments, the method may include transmitting, to the terminal node, information that identifies the first time offset or the second time offset. In some embodiments, the method may include transmitting a control signal (e.g., a DCI or MAC layer signaling) indicating one of the one or more activated TCI states to use.

In some embodiments, the one of the one or more activated TCI states may be associated with a same beam group as a previous TCI state in use. The previous TCI state in use, as described herein, may refer to the latest indicated TCI state that may be associated with, e.g., DMRS of PDCCH, DMRS of PDSCH, NZP-CSI-RS, PTRS, PRS, or SSB. In some embodiments, the one or more activated TCI states may not be associated with a same beam group as a previous TCI state in use. In some embodiments, the method may further include, based on a group report for a TCI state being outdated, determining to replace the first time offset with the second time offset. In some embodiments, a beam group may be based on one or more spatial domain reception properties (e.g., spatial characteristics of a receive filter) or latency for a beam switch.

As described above, FIG. 10 is provided as an example. Other examples are possible according to some embodiments.

FIG. 11a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 11a.

As illustrated in the example of FIG. 11a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-10.

For instance, in one embodiment, apparatus 10 may be controlled by memory 14 and processor 12 to transmit information indicating that one or more activated TCI states are associated with a set of beam groups. The set of beam groups includes one or more beam groups. In one embodiment, apparatus 10 may be controlled by memory 14 and processor 12 to communicate with a terminal node based on the transmitted information.

FIG. 11b illustrates an example of an apparatus 20 according to another embodiment. In an embodiment, apparatus 20 may be a node or element in a communications network or associated with such a network, such as a terminal node, UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 11b.

As illustrated in the example of FIG. 11b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-10.

For instance, in one embodiment, apparatus 20 may be controlled by memory 24 and processor 22 to obtain information indicating that one or more activated TCI states are associated with a set of beam groups. In one embodiment, apparatus 20 may be controlled by memory 24 and processor 22 to operate based on the obtained information.

Therefore, certain example embodiments provide several technological improvements, enhancements, and/or advantages over existing technological processes. For example, some benefits of some example embodiments are reduced beam switching times and reduced scheduling restrictions. Another example benefit is increased efficiency of spatial multiplexing. Accordingly, the use of some example embodiments results in improved functioning of communications networks and their nodes and, therefore constitute an improvement at least to the technological field of beam switching and/or multiplexing, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa.

One having ordinary skill in the art will readily understand that the example embodiments as discussed above may be practiced with operations in a different order, and/or with hardware elements in configurations which are different than those which are disclosed. Therefore, although some embodiments have been described, it would be apparent to those of skill in the art that certain modifications, variations, and alternative constructions would be apparent, while remaining within the spirit and scope of example embodiments.

According to a first embodiment, a method may include obtaining, by a terminal node, information indicating that one or more activated TCI states are associated with a set of beam groups. The method may include operating based on the obtained information.

In a variant, the information may be obtained explicitly from a command for activating or deactivating one or more TCI states. In a variant, the activation or deactivation command may include information for enabling or disabling an association of one or more TCI states with a set of beam groups. In a variant, alternatively, or additionally, the information may be obtained implicitly from beam group configuration signaling that configures a number of beams per beam group included in the set of beam groups, or a number of beam groups included in the set of beam groups.

In a variant, operating based on the obtained information may include determining that the one or more activated TCI states are associated with beam group-based reporting for the set of beam groups. In a variant, operating based on the obtained information may include detecting a control signal indicting one of the one or more activated TCI states to use. In a variant, operating based on the obtained information may include determining whether the indicated one TCI state is associated with a same beam group as a previous TCI state in use. In a variant, operating based on the obtained information may include operating based on the determination of whether the indicated one TCI state is associated with the same beam group.

In a variant, operating based on the determination may include determining that a communication from a network node is to use a time offset associated with the same beam group. In a variant, operating based on the determination may include determining that the communication is to use one or more simultaneous spatial domain receive filters that are the same as the previous TCI state. In a variant, the indicated one TCI state may be associated with the same beam group.

In a variant, operating based on the determining may include determining that a communication from a network node is to use a different time offset than a time offset used for a beam group of the pervious TCI state. In a variant, operating based on the determining may include determining that the communication is to use one or more simultaneous spatial domain receive filters that are different from the previously indicated TCI state. In a variant, the indicated one TCI state may not be associated with the same beam group. In a variant, the method may further include, based on a group report for a TCI state being outdated, determining that the communication from the network node is to use a different time offset. In a variant, a beam group may be based on one or more spatial domain reception properties or latency for a beam switch.

According to a second embodiment, a method may include transmitting information indicating that one or more activated TCI states are associated with a set of beam groups. The method may include communicating with a terminal node based on the transmitted information.

In a variant, the information may be transmitted explicitly in a command for activating or deactivating one or more TCI states. In a variant, the activation or deactivation command may include information for enabling or disabling an association of one or more TCI states with a set of beam groups. The information may encapsulate one or more R bits included in a MAC CE, RRC signaling, or physical layer signaling. In a variant, the information may be indicated implicitly in beam group configuration signaling that configures a number of beams per beam group included in the set of beam groups, or a number of beam groups included in the set of beam groups. In a variant, the number of beam groups associated with activated TCI states can be implicitly indicated to the terminal node.

In a variant, the method may include determining a first time offset for TCI state changes within a same beam group of the set of beam groups and a second time offset for TCI state changes between different beam groups of the set of beam groups. In a variant, the method may include transmitting, to the terminal node, information that identifies the first time offset or the second time offset. In a variant, the method may include transmitting a control signal indicating one of the one or more activated TCI states to use.

In a variant, the one of the one or more activated TCI states may be associated with a same beam group as a previous TCI state in use. In a variant, the one of the one or more activated TCI states may not be associated with a same beam group as a previous TCI state in use. In a variant, the method may further include, based on a group report for a TCI state being outdated, determining to replace the first time offset with the second time offset. In a variant, a beam group may be based on one or more spatial domain reception properties or latency for a beam switch.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

PARTIAL GLOSSARY gNB 5G Node B
RX receive
SRS sounding reference signal
SRI SRS resource indication
CRI CSI-RS resource indicator
TCI transmission configuration indicator
TDD time division duplexing
TX transmit
UE user equipment

What is claimed is:

1. A method, comprising:
obtaining, by a terminal node, information indicating that one or more activated transmission configuration indicator states are associated with a set of beam groups; and
operating based on the obtained information; and
when operating based on the obtained information:
  detect a control signal indicating one of the one or more activated transmission configuration indicator states to use;
  determine whether the indicated one of the one or more activated transmission configuration indicator states is associated with a same beam group as that associated with a transmission configuration indicator state in use;
  based on the indicated one of the one or more activated transmission configuration indicator states being determined to be associated with the same beam group as that associated with the transmission configuration indicator state in use, determine to use at least one of the following for a communication: a time offset associated with the same beam group; or one or more simultaneous spatial domain receive filters that are the same as that used for the transmission configuration indicator state in use;
  operate based on the determination that the indicated one of the one or more activated transmission configuration indicator states is associated with the same beam group as that associated with the transmission configuration indicator state in use; and
  based on a group report for a transmission configuration indicator state being outdated, determine to use a different time offset for the communication.

2. The method according to claim 1,
wherein the information is obtained explicitly from a command for activating
or deactivating one or more transmission configuration indicator states, or
wherein the information is obtained implicitly from a beam group
configuration signaling that configures the number of beams in a beam group of the set of beam groups, or the number of beam groups included in the set of beam groups.

3. The method according to claim 2, wherein the command comprises information for enabling or disabling an association of one or more transmission configuration indicator states with the set of beam groups.

4. The method according to claim 1, wherein operating based on the obtained information further comprises:
determining that the one or more activated transmission configuration indicator states are associated with beam group-based reporting for the set of beam groups.

5. An apparatus, comprising:
at least one processor; and
at least one memory including computer program code,
wherein the at least one memory and the computer program code are configured to, with the at least one processor, cause the apparatus at least to:
  obtain information indicating that one or more activated transmission configuration indicator states are associated with a set of beam groups; and
  operate based on the obtained information; and
  when operating based on the obtained information:
    detect a control signal indicating one of the one or more activated transmission configuration indicator states to use;
    determine whether the indicated one of the one or more activated transmission configuration indicator states is associated with a same beam group as that associated with a transmission configuration indicator state in use;
    based on the indicated one of the one or more activated transmission configuration indicator states being determined to be associated with the same beam group as that associated with the transmission configuration indicator state in use, determine to use at least one of the following for a communication: a time offset associated with the same beam group; or one or more simultaneous spatial domain receive filters that are the same as that used for the transmission configuration indicator state in use;
    operate based on the determination that the indicated one of the one or more activated transmission configuration indicator states is associated with the same beam group as that associated with the transmission configuration indicator state in use; and
    based on a group report for a transmission configuration indicator state being outdated, determine to use a different time offset for the communication.

6. The apparatus according to claim 5, wherein the at least one memory and the computer program code are configured to, with the at least one processor, further cause the apparatus at least to:

obtain the information explicitly from a command for activating or deactivating one or more transmission configuration indicator states, or obtain the information implicitly from a beam group configuration signaling that configures the number of beams in a beam group of the set of beam groups, or the number of beam groups included in the set of beam groups.

7. The apparatus according to claim 6, wherein the activation or deactivation command comprises information for enabling or disabling an association of one or more transmission configuration indicator states with the set of beam groups.

8. The apparatus according to claim 5, wherein the at least one memory and the computer program code are configured to, with the at least one processor, further cause the apparatus, when operating based on the obtained information, at least to:

determine that the one or more activated transmission configuration indicator states are associated with the beam group-based reporting for the set of beam groups.

9. The apparatus according to claim 5, wherein a beam group is based on one or more spatial characteristics of a receive filter or latency for a beam switch.

10. An apparatus, comprising:

at least one processor; and at least one memory including computer program code, wherein the at least one memory and the computer program code are configured to, with the at least one processor, cause the apparatus at least to:

transmit information indicating that one or more activated transmission configuration indicator states are associated with a set of beam groups;

communicate with a terminal node based on the transmitted information;

determine a first time offset associated with a transmission configuration indicator state change within a same beam group of the set of beam groups or a second time offset associated with a transmission configuration indicator state change between different beam groups of the set of beam groups; and transmit, to the terminal node, information identifying the determined first time offset or second time offset.

11. The apparatus according to claim 10, wherein the information is transmitted explicitly in a command for activating or deactivating one or more transmission configuration indicator states, or wherein the information is indicated implicitly in a beam group configuration signaling that configures the number of beams in a beam group included of the set of beam groups, or the number of beam groups included in the set of beam groups.

12. The apparatus according to claim 11, wherein the activation or deactivation command comprises information for enabling or disabling an association of one or more transmission configuration indicator states with the set of beam groups.

* * * * *